(12) United States Patent
Hara et al.

(10) Patent No.: US 7,959,386 B2
(45) Date of Patent: Jun. 14, 2011

(54) SPLASH GUARD OF MACHINE TOOL

(75) Inventors: Kunio Hara, Yamanashi (JP); Kenji Yamada, Yamanashi (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 276 days.

(21) Appl. No.: 12/439,064

(22) PCT Filed: Sep. 4, 2006

(86) PCT No.: PCT/JP2006/317919
§ 371 (c)(1),
(2), (4) Date: Feb. 26, 2009

(87) PCT Pub. No.: WO2008/029485
PCT Pub. Date: Mar. 13, 2008

(65) Prior Publication Data
US 2009/0324354 A1    Dec. 31, 2009

(51) Int. Cl.
*B23Q 11/08* (2006.01)
(52) U.S. Cl. .......................................... 409/134; 74/608
(58) Field of Classification Search .................. 409/134, 409/135–137; 408/241 G; 451/451; 74/608–609
See application file for complete search history.

(56) References Cited

U.S. PATENT DOCUMENTS

| | | | | |
|---|---|---|---|---|
| 4,705,187 A | * | 11/1987 | Linn | 220/819 |
| 6,662,685 B2 | * | 12/2003 | Kuriki et al. | 74/612 |
| 7,223,221 B2 | * | 5/2007 | Sugata et al. | 409/134 |
| 7,387,478 B2 | * | 6/2008 | Anderson et al. | 409/134 |
| 7,607,872 B2 | * | 10/2009 | Hulse et al. | 409/134 |
| 2002/0054800 A1 | * | 5/2002 | Hwu et al. | 409/134 |

FOREIGN PATENT DOCUMENTS

| | | |
|---|---|---|
| JP | 62-203367 U | 12/1987 |
| JP | 63-62636 A | 3/1988 |
| JP | 2000190162 A | 7/2000 |
| JP | 2001205542 A | 7/2001 |

OTHER PUBLICATIONS

English abstract of JP 63-062636 from the JPO database, which JP '636 was published on Mar. 1988.*

* cited by examiner

*Primary Examiner* — Erica E Cadugan
(74) *Attorney, Agent, or Firm* — Paul & Paul

(57) ABSTRACT

A splash guard (25) of a machine tool for preventing chips generated when a workplace is machined by the machine tool or coolant from being scattered includes a rear cover (27) mounted on a rear of a bed (13) of the machine tool installed on the floor surface and defining a partition for a rear side of the machining area, and a front cover (29) defining a partition for a front side and lateral sides of the machining area. The front cover (29) is configured of a lower cover (31) placed on the bed (13) of the machine tool, and an upper cover (33) placed above the lower cover (31). The upper cover (33) has a plurality of legs (35) extending downward from the lower end thereof so that the upper cover (33), when arranged above the lower cover (31), is supported on the floor surface by the plurality of legs (35).

3 Claims, 4 Drawing Sheets

SPLASH GUARD OF MACHINE TOOL

TECHNICAL FIELD

The present invention relates to a splash guard for preventing chips and coolant from being scattered when a workpiece is machined by a machine tool.

BACKGROUND ART

It is common practice to surround a machining area of a machine tool such as a machining center, a lathe or a grinding machine with a splash guard in order to prevent chips and coolant from being scattered when machining a workpiece. Such a splash guard is often located on the bed of the machine tool so as to surround the machining area in order to prevent the scattered coolant from running down along the inner surface of the splash guard and leaking out of the machine tool.

However, when installing a machine tool, various adjustments are required, including the adjustment for horizontally placing a movable table on the bed and the adjustment for assuring the rectilinear motion of the moving unit in orthogonal directions to each other along X, Y and Z axes. In this process, the splash guard, if covered on the upper part of the bed, is often inconvenient for adjustments. Therefore, in the prior art, a method has been employed in which the adjustments of the machine tool is performed without a splash guard and the splash guard is installed on the bed of the machine tool after the adjustment is finished.

However, if the splash guard is installed on the bed after the adjustments, there is a problem that the bed is deformed due to the weight of the splash guard and the adjustment is spoiled, resulting in the deterioration of machining accuracy.

As a splash guard enabling this problem to be avoided, Japanese Unexamined Patent Publication No. 63-62636, for example, discloses a splash guard which is configured of a rear cover fixed on a back of a base of a machine tool to form a screen behind a table of the machine tool and a front cover surrounding the table in cooperation with the rear cover and having legs with castors so as to be movable in relation to the rear cover.

However, in the case as described above where the whole machine tool is accommodated within the splash guard larger than the machine tool, the space for installing the splash guard larger than the machine tool is required, thereby posing the problem of an increased installation space. Since the splash guard is larger than the machine tool, another problem occurs in that the scattered coolant which may run down along the inner surface of the splash guard and may leak out of the machine tool.

DISCLOSURE OF THE INVENTION

Accordingly, it is an object of the present invention to provide a splash guard which can reduce the deformation of the bed under the weight of the splash guard installed, without increasing the installation space for the machine tool.

According to the present invention, there is provided a splash guard of a machine tool, which includes a rear cover mounted on a rear of a bed of the machine tool installed on a floor surface and defining a partition for a rear side of a machining area and a front cover defining a partition, for a front side and lateral sides of the machining area, said rear cover and said front cover surrounding the machining area to prevent coolant and chips generated by the machine tool machining the workpiece from being scattered around, wherein the front cover includes a lower cover placed on the bed of the machine tool and an upper cover placed above the lower cover and wherein the upper cover includes a plurality of legs extending downward from the lower end thereof so that the upper cover, when the upper cover is placed above the lower cover, is supported on the floor surface, by the plurality of legs.

In the splash guard of the machine tool described above, when the upper cover is placed above the lower cover, the lower end portion of the upper cover is preferably nested in the inside of the upper end portion of the lower cover.

The splash guard further preferably includes an elastic seal member held at the fitting portion between the lower end portion of the upper cover and the upper end portion of the lower cover.

In the splash guard of the machine tool according to the present invention, the upper cover surrounding the machining area is supported on the floor surface by the plurality of legs, and therefore, the weight of the upper cover does not substantially act on the bed and the deformation of the bed can be suppressed. Therefore, even if the upper cover is placed above the lower cover after the adjustment is made, the deterioration of the machine accuracy can be minimized.

BEST MODE FOR CARRYING OUT THE INVENTION

A preferred embodiment of the present, invention will be described below with reference to the accompanying drawings.

Figure 1:
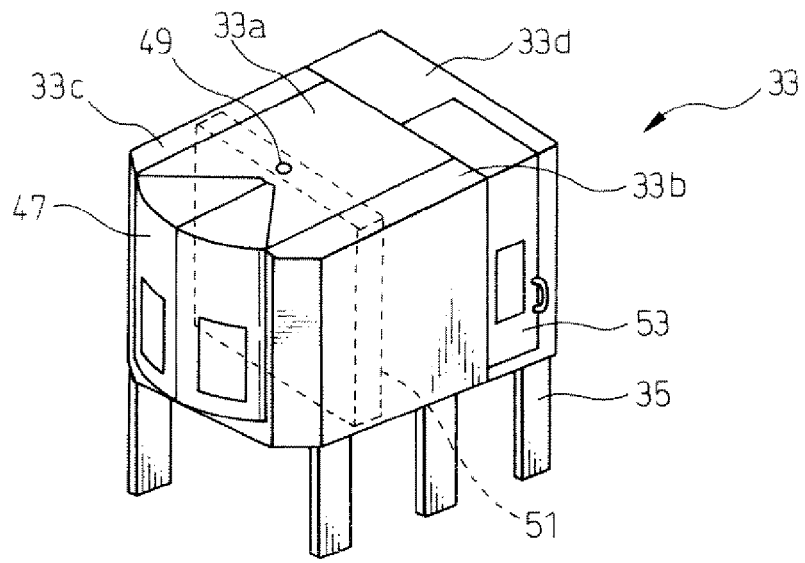
FIG. 1 is a perspective view of an upper cover of a splash guard according to the present invention.
Figure 2:
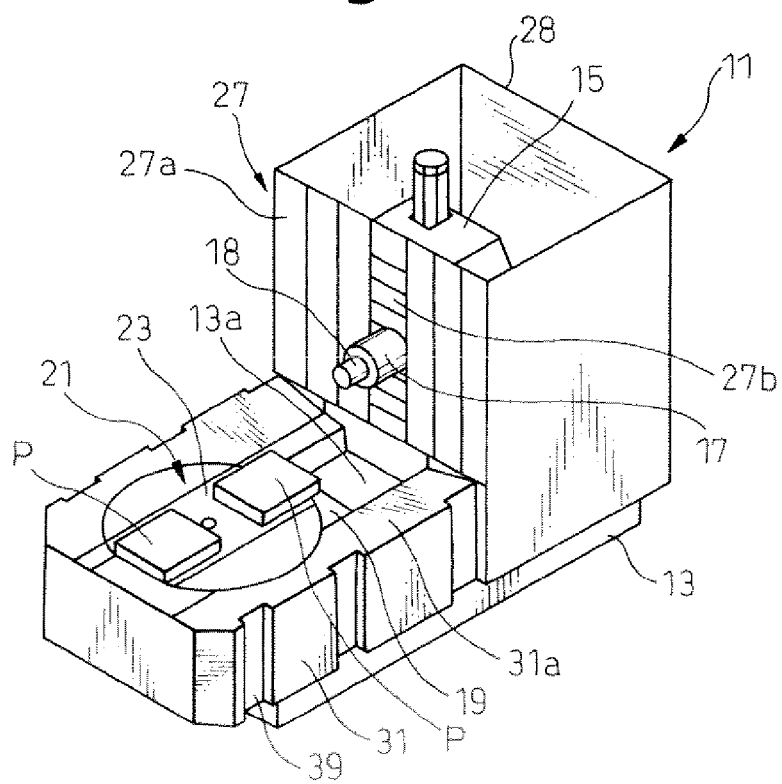
FIG. 2 is a perspective view of a machine tool having mounted thereon a lower cover and a rear cover of the splash guard according to the present invention.
Figure 3:
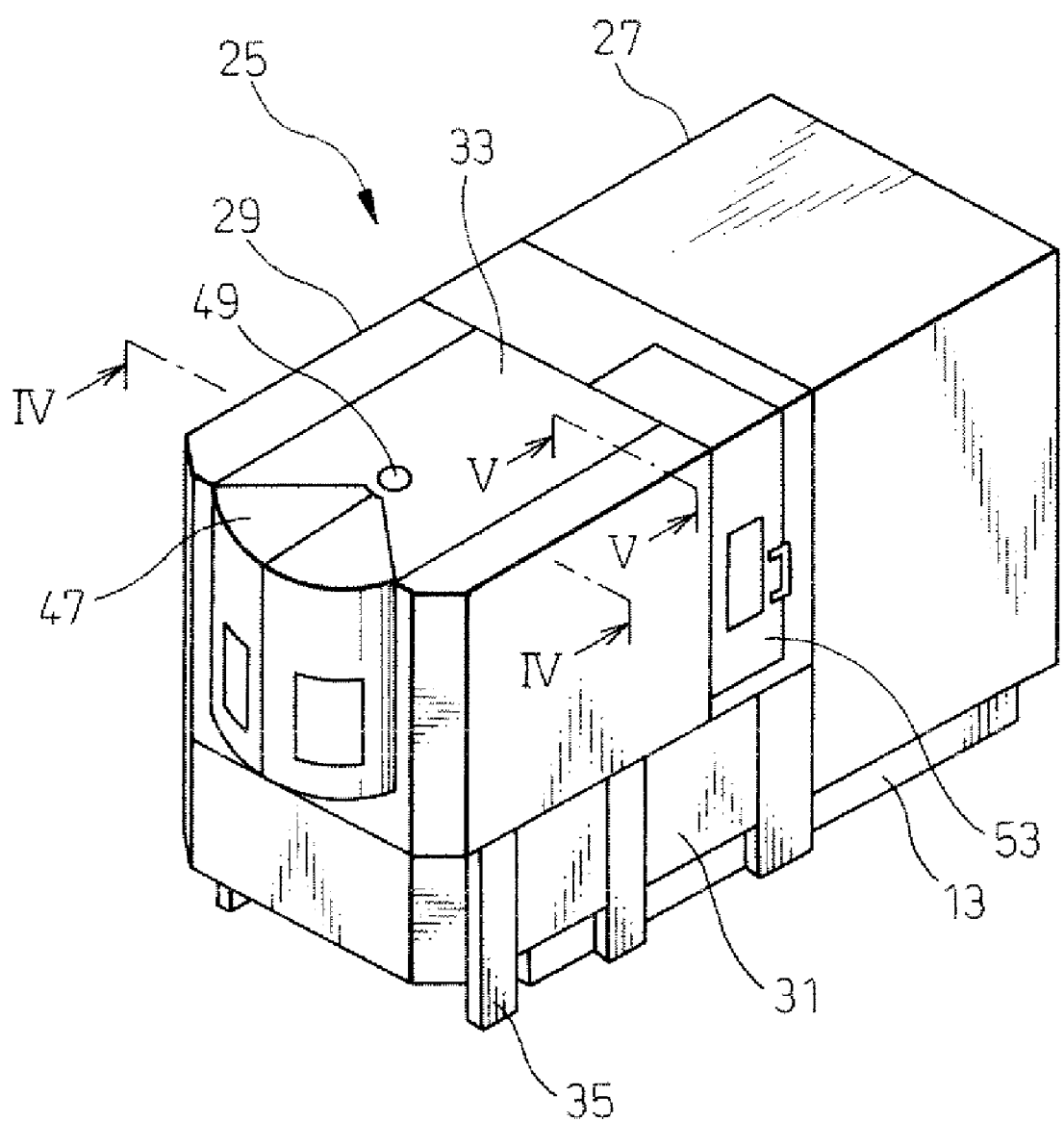
FIG. 3 is a perspective view of the splash guard and the machine tool with the upper cover shown in FIG. 1 and the lower cover and rear cover shown in FIG. 2 being assembled.

First, referring to FIGS. 1 to 3, a general configuration of a machine tool using a splash guard according to the present invention will, be described. Although a horizontal machining center is used as a machine tool 11 in the shown embodiment, the invention is also applicable to another arbitrary types of machine tools such as a vertical machining center.

Machine tool 11 shown in the figures includes a bed 13 installed on a floor surface, a column 15 erected on bed 13 so as to be movable in left-right direction (along X-axis), a spindle head 17 supported by column 15 so as to be movable in vertical direction (along Y-axis), a table 19 constituting a pallet mount provided on bed 13 so as to be movable in front-back direction (along Z-axis) and a pallet changer 21 provided on bed 13 to change a pallet P placed on table 19, and machines a workpiece by moving a tool (not shown) mounted at the forward end of a spindle 18 rotatably supported on spindle head 17 and a workpiece (not shown) mounted on pallet P placed on table 19 relative to each other. Pallet change unit 21 has a substantially H-shaped burnable pallet change arm 23 which includes two arm parts adapted to extend in opposite directions, a direction toward the spindle and a direction toward the setup station (away from the spindle). By turning pallet change arm 23 of pallet change unit 21, any one of pallets P having mounted thereon a workpiece set up at the setup station can be moved to the side of spindle 17 and placed on table 19, while the other pallet P having mounted thereon a workpiece machined can be moved to the side of the setup station from the side of spindle 17.

In the machine tool described above, the workpiece is machined while supplying coolant to a machining area where the tool is in contact with the workpiece, and therefore, during the machining process, chips and coolant are scattered around. The splash guard according to the present invention is used to prevent the chips generated and the coolant used In the machining of the workpiece on machine tool 11 from being scattered around.

As shown in FIGS. 1 to 3, splash guard 25 according to the present invention includes a rear cover 27 mounted on a rear part of bed 13 of machine tool 11 and defining a partition between column 15 of machine tool 11 and the machining area in front of it, i.e. a partition for the rear side of the machining area, a front cover 29 mounted on a front part of bed 13 and defining a partition for the front side, lateral sides and the upper side of the machining area of machine tool 11, and a column cover 28 defining a partition between the moving area of column 15 and the exterior.

Rear cover 27 includes a telescopic cover 27a provided on each of the left and right sides of spindle head 17 so as to be able to telescopically extend and contract, and a telescopic cover 27b provided on each of the upper and lower sides of spindle head 17 so as to be able to telescopically extend and contract, and can be moved in the vertical direction and in the left-right direction with the front part of spindle head 17 projected into the machining area from rear cover 27.

Front cover 29 is configured of a lower cover 31 mounted on bed 13 and an upper cover 33 disposed above lower cover 31. Lower cover 31 is mounted on the top surface of bed 13 so as to surround the lateral sides and front side of the machining area. Lower cover 31 preferably includes a chute portion 31a covering a part of the top surface of bed 13. Chute portion 31a extends diagonally downward from, the two sides of bed 13 toward a collecting groove 13a formed at the center of bed 13 so that the coolant and the chips having fallen on chute portion 31a are collected in collecting groove 13a of bed 13. On the other hand, upper cover 33 is configured so as to surround the front side, lateral sides and upper side of the machining area. In order to facilitate the assembly process, upper cover 33 is preferably adapted to be divisible into a central portion 33a, a right side portion 33b and left side portion 33c on both sides of central portion 33a, and a rear portion 33d. Also, a plurality of legs 35 extending to the floor surface from the lower end portion of upper cover 33 is provided so that the weight of upper cover 33 is supported by the plurality of legs 35 when upper cover 33 is placed above lower cover 31. Therefore, even if upper cover 33 is placed above lower cover 31, the weight of upper cover 33 does not substantially act on lower cover 31 and bed 13 and does not deform lower cover 31 and bed 31.

Figure 4:
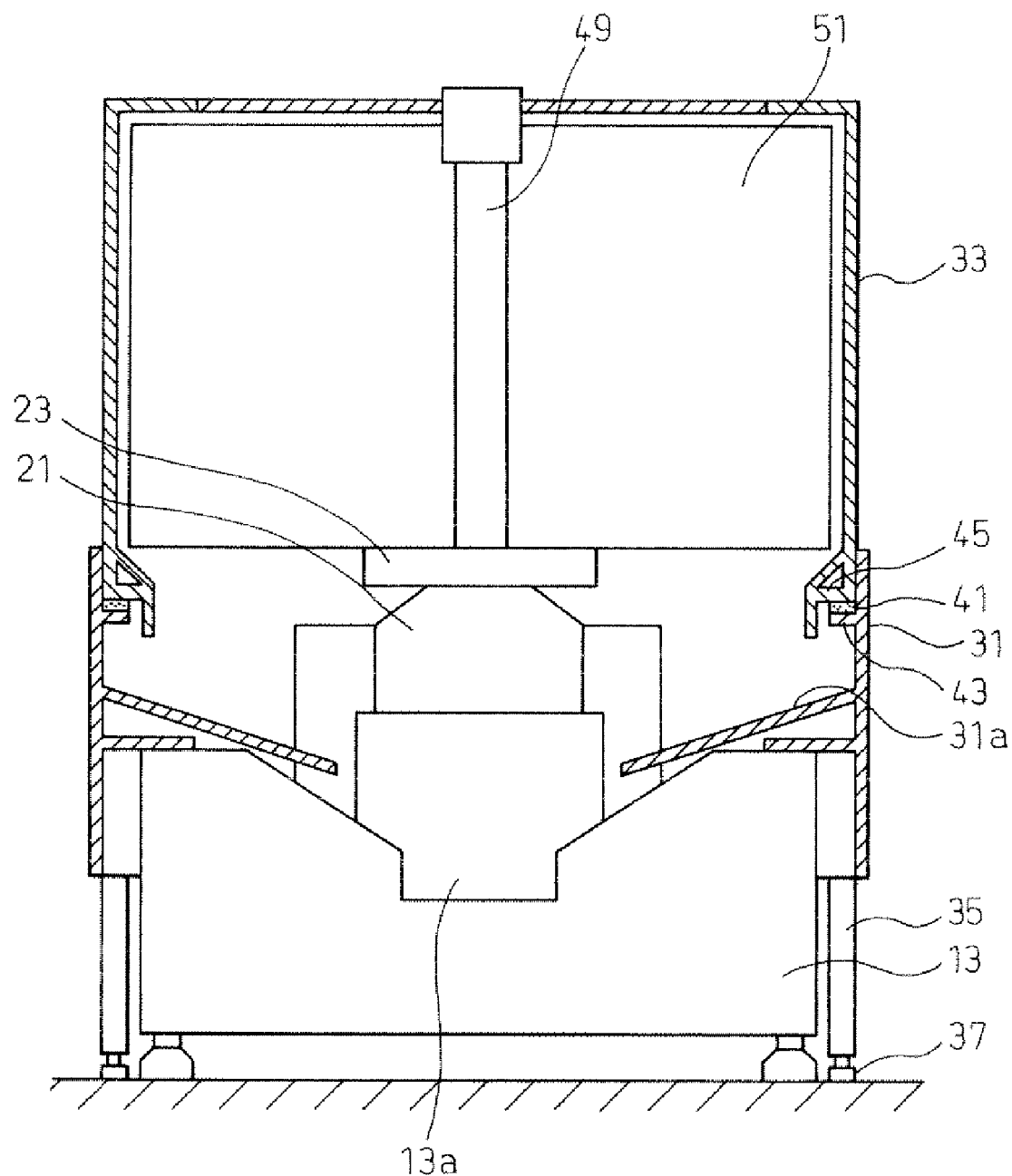
FIG. 4 is a sectional view taken along a line IV-IV of FIG. 3, as seen, from the direction, of the arrow.

Each leg 35, as shown in FIG. 4, preferably has a length adjustment mechanism 37 for adjusting the length thereof. Length adjustment mechanism 37 can be realized by, for example, forming each leg 35 by first and second parts adapted to be threadedly engaged with each other. Various other well-known structures can be employed as length adjustment mechanism 37. If each leg 35 has such a length adjustment mechanism 37, the length of each leg 35 can be changed in accordance with a step, if any, on the floor, thereby making it possible to reduce or equalize the weight of upper cover 33 acting on lower cover 31.

The side surfaces of lower cover 31 are preferably formed with a plurality of grooves 39 which allow legs of upper cover 33 to pass therethrough. By arranging legs 35 of upper cover 33 so as to pass through the plurality of grooves 39 thus formed, the installation space for splash guard 25 can be minimized. However, as long as legs 35 of upper cover 33 are constructed, not to exert the weight of upper cover 33 on lower cover 31 and bed 13, other structures can alternatively be employed. For example, the plurality of legs 35 of upper cover 33 may be configured to extend outside lower cover 31.

Further, as seen from FIG. 4, the lower end portion of upper cover 33 is configured to be nested in the inside of the upper end portion of lower cover 31. By nesting the lower end portion of upper cover 33 in the inside of the upper end portion of lower cover 31 in this way, the coolant scattered on and falling along the inner surface of upper cover 33 is made hard to leak through the joint between upper cover 33 and lower cover 31. By nesting the lower end portion of upper cover 33 in the inside of the upper end portion of lower cover 31, the horizontal position of upper cover 33 can be effectively restricted by lower cover 31.

In the fitting portion described above, an elastic member 41 made of a foam material or the like is preferably held between the lower end portion of upper cover 33 and the upper end portion of lower cover 31. Specifically, elastic member 41 is held, as shown in FIG. 4, between an protrusion 43 extending inward from the inner side of the upper end portion of lower cover 31 and a lip 45 extending inward from the lower end portion of upper cover 33. Elastic member 41 functions as a seal member which positively prevents the scattered coolant from leaking out of splash guard 25 through between the lower end portion of upper cover 33 and the upper end portion of lower cover 31. Elastic member 41 can absorb the variation, of the position of upper cover 33 with respect to lower cover 31 to some degree, if any, and thus can reduce the effect of the change in the load which upper cover 33 exerts on lower cover 31 and bed 13. Further, elastic member 41 functions as a vibration absorber which absorbs a vibration transmitted from machine tool 11 to lower cover 31 through bed 13. As a result, the adverse effect on the machining accuracy or generation of a resonance sound can be avoided which otherwise might be caused by the vibration transmitted from, lower cover 31 to upper cover 33 and the resulting resonance of upper cover 33. The screws or the like used with upper cover 33 can be prevented from loosening for improved job safety.

In the embodiment shown in the figures, various other designs are incorporated in upper cover 33 in order to minimize the load acting on lower cover 31 and bed 13 when upper cover 33 is placed above lower cover 31. These designs will be described in detail below.

Upper cover 33 has a front door 47 for access to the setup station side of pallet changer 21 arranged in splash guard 25. Front door 47 is adapted to slide on a rail supported by upper cover 33 so that the weight of front door 47 does not act on lower cover 31. Also, in order to prevent the coolant and the chips from being scattered to the setup station area from the machining area, a pivoted door 51 defining a partition between the machining area on the side of spindle head 17 and the setup station area on the side of front door 47 and adapted to pivot about a pivot shaft along with pallet change arm 23 of pallet changer 21 is provided between the spindle head 17 side of pallet changer 21 and the front door 47 side (the setup station side) thereof. This pivot shaft 49 is coupled to upper cover 33 with the upper end thereof rotatably supported by upper cover 33. Therefore, even if upper cover 33 is placed above lower cover 31, the load of pivot shaft 49 and pivoted door 51 does not act on lower cover 31. Note that the lower end of pivot shaft 49 is connected to the pivot shaft of pallet change arm 23 so as to imposing substantially no load on pallet changer 21 and is adapted to pivot together with pallet change arm 23.

Figure 5:
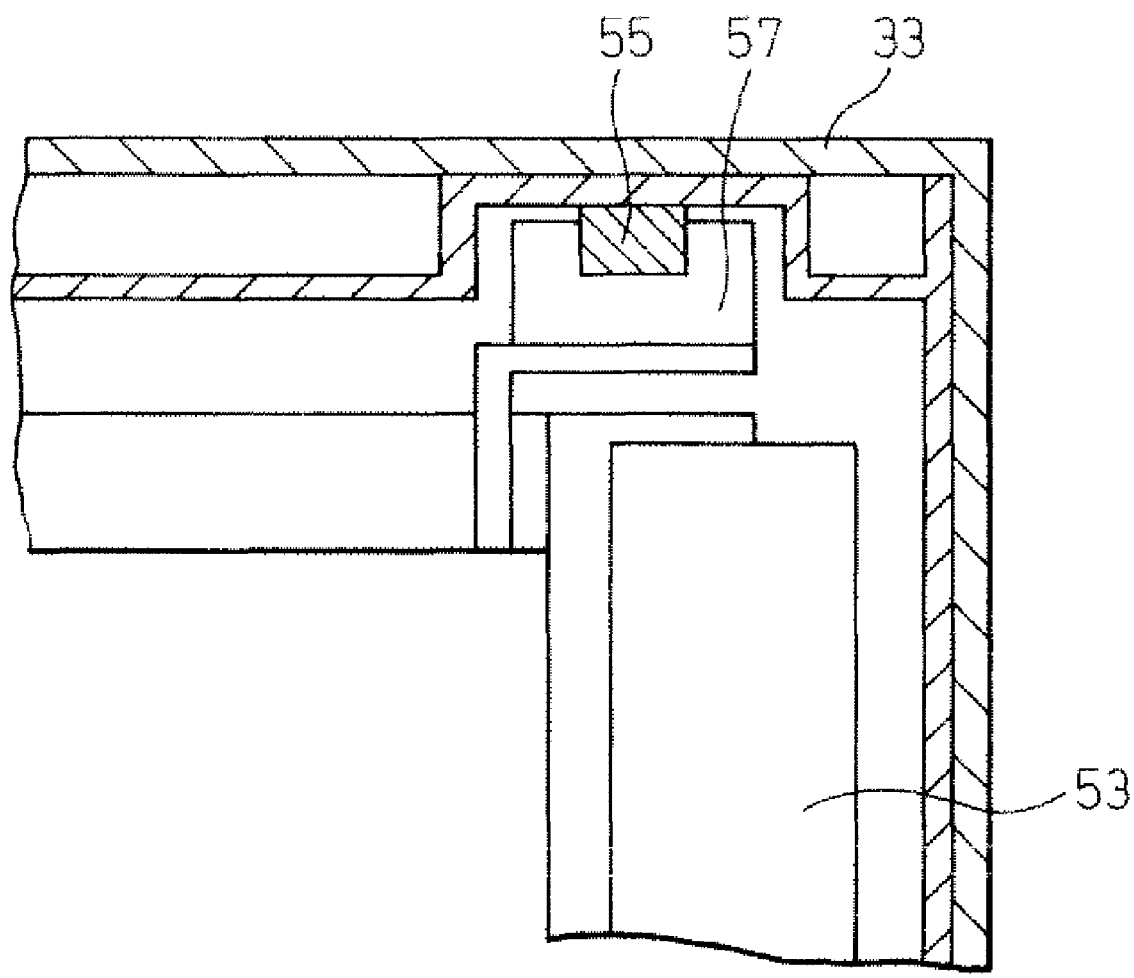
FIG. 5 is a sectional view taken along a line V-V of FIG. 3, as seen from the direction of the arrow, showing a splash guard door support structure.

Further, a slidable operation door 53 provided on the spindle head 17 side of upper cover 33, as shown in FIG. 5, is supported on upper cover 33 so as to be movable along a guide rail 55 by mounting, on the upper part of operation door 53, a linear guide 57 engaged with guide rail 55 mounted to the top part of upper cover 33. By supporting operation door 53 by suspension from upper cover 33 in this way, the weight of operation door 53 does not substantially act on lower cover 31 even if upper cover 33 is placed above lower cover 31.

Next, the procedure for installation of the splash guard according to the present invention will be described. First, rear cover 27 and lower cover 31 of front cover 29 are mounted on bed 13 of machine tool 11. Even under this condition, the upper portion of bed 13 of machine tool 11 is in open state, and therefore, the crane or the like can be caused to access table 19 on bed 13 from above and table 19 can be easily removed from bed 13 to carry out adjustment process. After the adjustment process is finished and table 19 is placed on bed 13, upper cover 33 of front cover 29 is placed above lower cover 31. At this time, the plurality of legs 35 of upper cover 33 are arranged so as to pass through grooves 39 formed on the side surfaces of lower cover 31. Therefore, upper cover 33 is supported above lower cover 31 by the plurality of legs 35 by imposing substantially no load on lower cover 31 and bed 13. At this time, elastic member 41 is placed between the upper end portion of lower cover 31 and the lower end portion of lower cover 31 so as to be held between protrusion 43 at the upper end portion of lower cover 31 and lip 45 at the lower end portion of lower cover 31 when upper cover 33 is placed above lower cover 31. An L-shaped portion provided on the front outer surface of rear cover 27 and bent inward and a L-shaped portion provided on the rear outer surface of upper cover 33 and bent outward are fitted in spaced relation with each other thereby to restrict the position of upper cover 33 in a horizontal plane.

As described above, upper cover 33 supported by the plurality of legs 35, is placed above lower cover 31 to form splash guard 25 surrounding the machining space of machine tool 11, so that the weight of upper cover 33 placed above lower cover 31 does not substantially act on lower cover 31 and bed 13. As a result, even if the upper cover 33 is placed above lower cover 31 after the adjustment process is carried out with upper cover 33 not arranged above lower cover 31, bed 13 is not substantially deformed and additional adjustments can be eliminated.

The invention claimed is:

1. A splash guard of a machine tool installed on a floor surface and having a machining area located at a front of the machine tool, the splash guard comprising a rear cover mounted on a rear of a bed of the machine tool, the bed installed on the floor surface, and the splash guard defining a partition for a rear side of the machining area, and a front cover defining a partition for a front side and lateral sides of the machining area, said rear cover and said front cover surrounding the machining area to prevent coolant and chips generated by the machine tool machining the workpiece from being scattered around, wherein the front cover includes a lower cover placed on the bed of the machine tool and an upper cover placed above the lower cover and wherein the upper cover includes a plurality of legs extending downward from the lower end thereof so that the upper cover, when the upper cover is placed above the lower cover, is supported on the floor surface by the plurality of legs, and wherein when the upper cover is placed above the lower cover, the lower end portion of the upper cover is nested in the inside of the upper end portion of the lower cover.

2. The splash guard of the machine tool according to claim 1, further comprising an elastic seal member held between the lower end portion of the upper cover and the upper end portion of the lower cover.

3. The splash guard of the machine tool according to claim 1, further comprising a seal member held between the lower end portion of the upper cover and the upper end portion of the lower cover.

* * * * *